United States Patent
Penumetsa (10) Patent No.: US 7,542,452 B2
(45) Date of Patent: Jun. 2, 2009

(54) SYSTEMS AND METHODS FOR IMPLEMENTING AN ENHANCED MULTI-CHANNEL DIRECT LINK PROTOCOL BETWEEN STATIONS IN A WIRELESS LAN ENVIRONMENT

(75) Inventor: Sitarama Penumetsa, Vancouver, WA (US)

(73) Assignee: Sharp Laboratories of America, Inc., Camas, WA (US)

( * ) Notice: Subject to any disclaimer, the term of this patent is extended or adjusted under 35 U.S.C. 154(b) by 1054 days.

(21) Appl. No.: 10/821,420

(22) Filed: Apr. 9, 2004

(65) Prior Publication Data

US 2005/0226183 A1    Oct. 13, 2005

(51) Int. Cl.
H04W 84/12    (2006.01)

(52) U.S. Cl. ............... 370/338; 370/346; 455/445

(58) Field of Classification Search ........... 370/328, 370/329, 346, 338; 455/452.2, 67.11, 452.1, 455/445, 453
See application file for complete search history.

(56) References Cited

U.S. PATENT DOCUMENTS

| | | | |
|---|---|---|---|
| 5,960,344 | A | 9/1999 | Mahany |
| 6,580,704 | B1 * | 6/2003 | Wellig et al. ............ 370/338 |
| 6,791,962 | B2 * | 9/2004 | Wentink .................. 370/338 |
| 7,146,186 | B1 * | 12/2006 | Moon et al. ............ 455/552.1 |
| 7,251,235 | B2 * | 7/2007 | Wentink .................. 370/338 |
| 7,450,550 | B2 * | 11/2008 | Jin ......................... 370/338 |
| 2002/0141375 | A1 | 10/2002 | Choi |
| 2002/0168993 | A1 * | 11/2002 | Choi et al. ............... 455/522 |
| 2003/0100308 | A1 | 5/2003 | Rusch |
| 2004/0090924 | A1 * | 5/2004 | Giaimo et al. ............ 370/252 |
| 2005/0036469 | A1 * | 2/2005 | Wentink ................... 370/338 |
| 2005/0094588 | A1 * | 5/2005 | Wentink ................... 370/315 |
| 2005/0135295 | A1 * | 6/2005 | Walton et al. ............. 370/328 |
| 2006/0223524 | A1 * | 10/2006 | Ginzburg ................. 455/424 |

FOREIGN PATENT DOCUMENTS

| | | |
|---|---|---|
| JP | 2003-244161 | 8/2003 |
| WO | WO 01/71981 | 9/2001 |

OTHER PUBLICATIONS

ISO/IEC 8802-11 Information Technology—Telecommunications and Information Exchange Between Systems—Local and Metropolitan Area Networks—Specific Requirements—Part 11; Wireless LAN Medium Access Control (MAC) and Physical Layer (PHY) Specifications, 1999.
802.11e-D6.0 Draft of 802.11e: Medium Access Control (MAC) Enhancements for Quality of Service (QoS), Nov. 2003.
Srini Kandala, "Direct Link Protocol", IEEE 802.11-02/438, Oct. 2000.
Digital Home Working Group (DHWG) Usage Cases, Sep. 16, 2003.

* cited by examiner

*Primary Examiner*—Blane J Jackson
(74) *Attorney, Agent, or Firm*—Austin Rapp & Hardman (57) ABSTRACT

Systems and methods for implementing an enhanced multi-channel direct link protocol between wireless stations in a wireless LAN environment are disclosed. An exemplary method is implemented in a first wireless station that is part of an infrastructure basic service set network. The infrastructure basic service set network also includes an access point and a second wireless station. The wireless stations of the infrastructure basic service set network communicate on an infrastructure frequency channel. The method involves determining that at least one condition is satisfied for establishing a direct link with the second wireless station for transmission of data from the first wireless station to the second wireless station. The direct link is established with the second wireless station on a direct link frequency channel that is different than the infrastructure frequency channel. The data is transmitted to the second wireless station via the direct link.

27 Claims, 8 Drawing Sheets

SYSTEMS AND METHODS FOR IMPLEMENTING AN ENHANCED MULTI-CHANNEL DIRECT LINK PROTOCOL BETWEEN STATIONS IN A WIRELESS LAN ENVIRONMENT

TECHNICAL FIELD

The present invention relates generally to wireless networking. More specifically, the present invention relates to systems and methods for implementing an enhanced multi-channel direct link protocol between wireless stations in a wireless LAN environment.

BACKGROUND

Computer and communication technologies continue to advance at a rapid pace. Indeed, computer and communication technologies are involved in many aspects of a person's day. For example, many devices being used today have a small computer inside of the device. These small computers come in varying sizes and degrees of sophistication. Computers commonly used include everything from hand-held computing devices to large multi-processor computer systems.

Computers are used in almost all aspects of business, industry and academic endeavors. More and more homes are using computers as well. The pervasiveness of computers has been accelerated by the increased use of computer networks, including the Internet. Most companies have one or more computer networks and also make extensive use of the Internet. The productivity of employees often requires human and computer interaction. Improvements in computers and software have been a force for bringing about great increases in business and industrial productivity.

A computer network may be organized as a stack of layers. The purpose of each layer is to offer certain services to the higher layers. Typically, layer N on one computing device communicates with layer N on another computing device. The rules and conventions used in this communication are collectively known as the layer N protocol. Of course, in reality no data are directly transferred from layer N on one machine to layer N on another machine. Instead, each layer passes data and control information to the layer immediately below it, until the lowest layer is reached. The lowest layer generally includes the physical medium through which the data is actually transferred.

One popular model for computer networks is the Open Systems Interconnection (OSI) model. The OSI model includes seven layers. In ascending order, these layers include the physical layer, the data link layer, the network layer, the transport layer, the session layer, the presentation layer, and the application layer. In many computer networks, the protocols used to determine who goes next on a multiaccess channel belong to a sublayer of the data link layer called the Medium Access Control (MAC) sublayer. The MAC sublayer is important in many local area networks (LANs), many of which use a multiaccess channel as the basis for communication.

A wireless LAN is a system in which every device (often called a wireless station) has a radio modem and an antenna with which it can communicate with other devices and/or systems. Wireless LANs are becoming increasingly common in homes, office buildings, public places such as airports and coffee shops, and other places. There is a standard for wireless LANs, called IEEE 802.11, which many systems implement and which is becoming very widespread. Benefits may be realized by improved systems and methods that facilitate wireless networking of electronic devices in a more efficient and cost-effective manner.

BRIEF DESCRIPTION OF THE DRAWINGS

The present embodiments will become more fully apparent from the following description and appended claims, taken in conjunction with the accompanying drawings. Understanding that these drawings depict only typical embodiments and are, therefore, not to be considered limiting of the invention's scope, the embodiments will be described with additional specificity and detail through use of the accompanying drawings in which:

DETAILED DESCRIPTION

A computer-readable medium for storing program data that comprises executable instructions for implementing a method in a first wireless station is disclosed. The first wireless station is part of an infrastructure basic service set network. The infrastructure basic service set network also comprises an access point and a second wireless station. The wireless stations of the infrastructure basic service set network communicate on an infrastructure frequency channel. The method comprises determining that at least one condition is satisfied for establishing a direct link with the second wireless station for transmission of data from the first wireless station to the second wireless station. The method also comprises establishing the direct link with the second wireless station on a direct link frequency channel that is different than the infrastructure frequency channel. The method also comprises transmitting the data to the second wireless station via the direct link. In some embodiments, after the data has been transmitted to the second wireless station the method further comprises terminating the direct link and rejoining the infrastructure basic service set network.

In some embodiments, while the direct link is established between the first wireless station and the second wireless station, the method further comprises periodically tuning to the infrastructure frequency channel to receive every nth beacon from the access point. If a beacon is received that comprises a notification about downlink data for the first wireless station that is buffered at the access point, the method may also comprise determining whether a condition is satisfied for terminating the direct link. If the condition is satisfied, the method may also comprise terminating the direct link and rejoining the infrastructure basic service set network. If the condition is not satisfied, the method may also comprise tuning to the infrastructure frequency channel at scheduled time intervals to receive the downlink data from the access point.

In some embodiments, the method may comprise periodically tuning to the infrastructure frequency channel to receive every nth beacon. If the first wireless station does not see any buffered downlink data advertised in the beacons, the value of n may be increased.

In some embodiments, the method may also comprise obtaining unused frequency channels information about unused frequency channels near the first wireless station. The unused frequency channels information may be sent to the access point. The chosen direct link frequency channel may be received from the access point.

In some embodiments, determining that the at least one condition is satisfied for establishing the direct link comprises determining that the number of consecutive frames that have been generated at the first wireless station and that have a same destination address exceeds a threshold value, and determining that the destination address is in the same infrastructure basic service set network.

A computer-readable medium for storing program data that comprises executable instructions for implementing a method in a second wireless station is also disclosed. The second wireless station is part of an infrastructure basic service set network. The infrastructure basic service set network also comprises a first wireless station and an access point. The wireless stations of the infrastructure basic service set network communicate on an infrastructure frequency channel. The method comprises determining that at least one condition is satisfied for establishing a direct link with the first wireless station for transmission of data from the first wireless station to the second wireless station. The method also comprises establishing the direct link with the first wireless station on a direct link frequency channel that is different than the infrastructure frequency channel. The method also comprises receiving the data from the first wireless station via the direct link. In some embodiments, determining that the at least one condition is satisfied for establishing the direct link comprises determining that the number of consecutive frames that have been received at the second wireless station and that have a same source address exceeds a threshold value, and also determining that the source address is in the infrastructure basic service set network.

A computer-readable medium for storing program data that comprises executable instructions for implementing a method in an access point is also disclosed. The access point is part of an infrastructure basic service set network. The infrastructure basic service set network also comprises a first wireless station and a second wireless station. The wireless stations of the infrastructure basic service set network communicate on an infrastructure frequency channel. The method comprises receiving first unused frequency channels information about first unused frequency channels near the first wireless station. The method also comprises receiving second unused frequency channels information about second unused frequency channels near the second wireless station. The method also comprises using the first unused frequency channels information and the second unused frequency channels information to select a selected frequency channel that is available to both the first wireless station and the second wireless station and that is different than the infrastructure frequency channel and any other direct link channels in the basic service set. The method also comprises transmitting the selected frequency channel to the first wireless station.

A method in a first wireless station that is part of an infrastructure basic service set network is also disclosed. The infrastructure basic service set network also comprises an access point and a second wireless station. The wireless stations of the infrastructure basic service set network communicate on an infrastructure frequency channel. The method comprises determining that at least one condition is satisfied for establishing a direct link with the second wireless station for transmission of data from the first wireless station to the second wireless station. The method also comprises establishing the direct link with the second wireless station on a direct link frequency channel that is different than the infrastructure frequency channel. The method also comprises transmitting the data to the second wireless station via the direct link.

A method in a second wireless station that is part of an infrastructure basic service set network is also disclosed. The infrastructure basic service set network also comprises a first wireless station and an access point. The wireless stations of the infrastructure basic service set network communicate on an infrastructure frequency channel. The method comprises determining that at least one condition is satisfied for establishing a direct link with the first wireless station for transmission of data from the first wireless station to the second wireless station. The method also comprises establishing the direct link with the first wireless station on a direct link frequency channel that is different than the infrastructure frequency channel and any other direct link channels already existing in the basic service set. The method also comprises receiving the data from the first wireless station via the direct link.

A method in an access point that is part of an infrastructure basic service set network is also disclosed. The infrastructure basic service set network also comprises a first wireless station and a second wireless station. The wireless stations of the infrastructure basic service set network communicate on an infrastructure frequency channel. The method comprises receiving first unused frequency channels information about first unused frequency channels near the first wireless station. The method also comprises receiving second unused frequency channels information about second unused frequency channels near the second wireless station. The method also comprises using the first unused frequency channels information and the second unused frequency channels information to select a selected frequency channel that is available to both the first wireless station and the second wireless station and that is different than the infrastructure frequency channel. The method also comprises transmitting the selected frequency channel to the first wireless station.

A first wireless station that is configured to be part of an infrastructure basic service set network is disclosed. The infrastructure basic service set network also comprises an access point and a second wireless station. The wireless stations of the infrastructure basic service set network communicate on an infrastructure frequency channel. The first wireless station comprises a processor and memory in electronic communication with the processor. Instructions are stored in the memory. The instructions are executable to implement a method that comprises determining that at least one condition is satisfied for establishing a direct link with the second wireless station for transmission of data from the first wireless station to the second wireless station. The method also comprises establishing the direct link with the second wireless station on a direct link frequency channel that is different than the infrastructure frequency channel. The method also comprises transmitting the data to the second wireless station via the direct link.

A first wireless station that is configured to be part of an infrastructure basic service set network is also disclosed. The infrastructure basic service set network also comprises a first wireless station and an access point. The wireless stations of the infrastructure basic service set network communicate on an infrastructure frequency channel. The second wireless station comprises a processor and memory in electronic communication with the processor. Instructions are stored in the memory. The instructions are executable to implement a method that comprises determining that at least one condition is satisfied for establishing a direct link with the first wireless station for transmission of data from the first wireless station to the second wireless station. The method also comprises establishing the direct link with the first wireless station on a direct link frequency channel that is different than the infrastructure frequency channel. The method also comprises receiving the data from the first wireless station via the direct link.

An access point that is configured to be part of an infrastructure basic service set network is also disclosed. The infrastructure basic service set network also comprises a first wireless station and a second wireless station. The wireless stations of the infrastructure basic service set network communicate on an infrastructure frequency channel. The access point comprises a processor and memory in electronic communication with the processor. Instructions are stored in the memory. The instructions are executable to implement a method that comprises receiving first unused frequency channels information about first unused frequency channels near the first wireless station. The method also comprises receiving second unused frequency channels information about second unused frequency channels near the second wireless station. The method also comprises using the first unused frequency channels information and the second unused frequency channels information to select a selected frequency channel that is available to both the first wireless station and the second wireless station and that is different than the infrastructure frequency channel and any other direct link channels already existing in the basic service set. The method also comprises transmitting the selected frequency channel to the first wireless station.

Various embodiments of the invention are now described with reference to the Figures, where like reference numbers indicate identical or functionally similar elements. It will be readily understood that the components of the present invention, as generally described and illustrated in the Figures herein, could be arranged and designed in a wide variety of different configurations. Thus, the following more detailed description of several exemplary embodiments of the present invention, as represented in the Figures, is not intended to limit the scope of the invention, as claimed, but is merely representative of the embodiments of the invention.

The word "exemplary" is used exclusively herein to mean "serving as an example, instance, or illustration." Any embodiment described herein as "exemplary" is not necessarily to be construed as preferred or advantageous over other embodiments. While the various aspects of the embodiments are presented in drawings, the drawings are not necessarily drawn to scale unless specifically indicated.

Several aspects of the embodiments described herein will be illustrated as software modules or components stored in a computing device. As used herein, a software module or component may include any type of computer instruction or computer executable code located within a memory device and/or transmitted as electronic signals over a system bus or network. A software module may, for instance, comprise one or more physical or logical blocks of computer instructions, which may be organized as a routine, program, object, component, data structure, etc., that performs one or more tasks or implements particular abstract data types.

In certain embodiments, a particular software module may comprise disparate instructions stored in different locations of a memory device, which together implement the described functionality of the module. Indeed, a module may comprise a single instruction, or many instructions, and may be distributed over several different code segments, among different programs, and across several memory devices. Some embodiments may be practiced in a distributed computing environment where tasks are performed by a remote processing device linked through a communications network. In a distributed computing environment, software modules may be located in local and/or remote memory storage devices.

Note that the exemplary embodiment is provided as an exemplar throughout this discussion, however, alternate embodiments may incorporate various aspects without departing from the scope of the present invention.

The order of the steps or actions of the methods described in connection with the embodiments disclosed herein may be changed by those skilled in the art without departing from the scope of the present invention. Thus, any order in the Figures or detailed description is for illustrative purposes only and is not meant to imply a required order.

Figure 1:
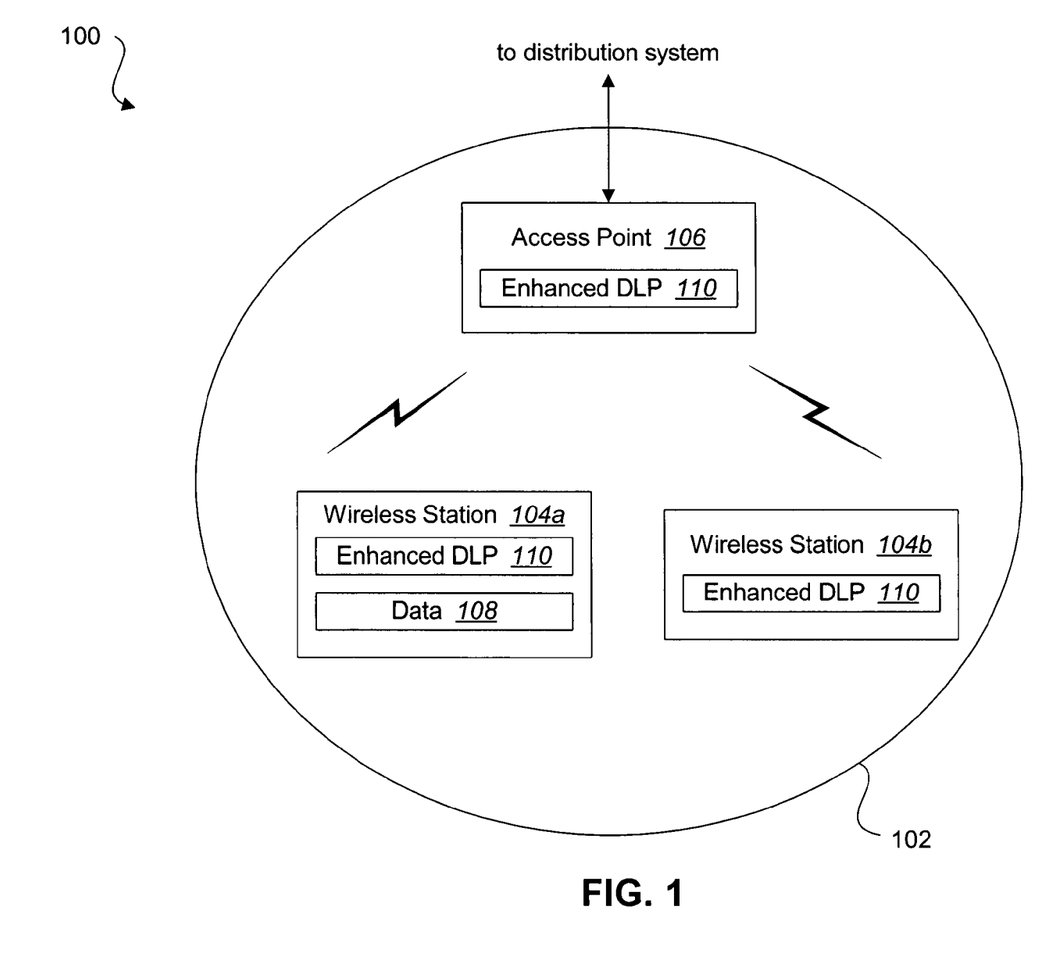
FIG. 1 is a block diagram illustrating an exemplary system in which some embodiments may be practiced.

FIG. 1 is a block diagram illustrating an exemplary system 100 in which some embodiments may be practiced. The system 100 includes an infrastructure basic service set (BSS) network 102. The infrastructure BSS network 102 includes a plurality of wireless stations (STA) 104. As used herein, a STA 104 is any electronic device that is capable of wireless communication. A STA 104 may either be mobile or stationary. Examples of some STAs 104 that may be used with embodiments disclosed herein include personal computers (PCs), laptops, personal digital assistants (PDAs), cellular phones, digital video cameras, wireless televisions (TVs), and so forth.

The infrastructure BSS network 102 also includes an access point (AP) 106. The AP 106 is a wireless station that provides access to a distribution system (DS) (not shown). The DS is the architectural component used to interconnect the infrastructure BSS network 102 to other networks (e.g., the Internet, other infrastructure BSS networks, etc.). The STAs 104 in the infrastructure BSS network 102 are in wireless communication with the AP 106. The STAs 104 and the AP 106 communicate with one another on a particular frequency channel, which will be referred to herein as the infrastructure frequency channel. Additional characteristics of the infrastructure BSS network 102, the STAs 104 and the AP 106 are discussed in greater detail in "IEEE Wireless LAN Edition," September 2003, which is hereby incorporated by reference in its entirety.

Often, one STA 104 within the infrastructure BSS network 102 has data 108 to transmit to another STA 104 within the same infrastructure BSS network 102. A typical example is a home network in which multiple electronic devices (TVs, PCs, cameras, etc.) are trying to communicate with each other wirelessly. The STA 104 that has the data 108 to transmit will sometimes be referred to herein as the first STA 104a or the source STA 104a, and the STA 104 that receives the data 108 will sometimes be referred to herein as the second STA 104b or the destination STA 104b. There may be many STAs 104 within the network 102. Access to the infrastructure frequency channel is handled by the Medium Access Control (MAC) sublayer on each of the STAs 104 within the network 102.

In some known infrastructure BSS networks 102, the MAC is implemented such that the first STA 104a sends the data 108 to the AP 106, and the AP 106 forwards the data 108 to the second STA 104b. This is the approach taken in the IEEE 802.11 standard. While this approach is good for stations trying to communicate with the external network, it's not a very good solution for BSSs having many devices trying to communicate with each other within the BSS itself. Also, the 802.11 MAC is CSMA based and hence with the increase in the number of wireless clients, the signaling and the contention overhead may increase so that the aggregate throughput may not satisfy the need of multiple high bandwidth delay sensitive wireless links. For high-bandwidth applications (e.g., multiple simultaneous high definition video links), the 802.11 MAC may not be able to handle the load and hence may lead to poor signal quality. The recently introduced IEEE 802.11e MAC can provide good service differentiation and hence can provide quality of service (QoS) for the different kinds of services in a typical wireless networking scenario. For further information please refer to the 802.11e-D6.0 Draft of 802.11e: Medium Access Control (MAC) Enhancements for Quality of Service (QoS) document which is hereby incorporated by reference in its entirety.

Direct Link Protocol (DLP) has been proposed in the IEEE 802.11e draft to address the issue of efficient communication between wireless stations 104 in the same BSS network 102. The DLP allows any two STAs 104 to exchange capability information through the AP 106 and establish a direct link (DL) between them in order to transfer data 108 directly. However, the DLP is defined in such a way that the AP 106 (or the centralized controller) is engaged during any direct link conversion, so that any other STAs 104 in the infrastructure BSS network 102 are not able to talk to the AP 106 or to instantiate DLs to other STAs 104 in the infrastructure BSS network 102 through the AP 106. Also, the DLP is designed in such a way that, though the STAs 104 are communicating directly, they are still a part of the infrastructure network controlled by the AP 106. Please refer to the 802.11e D6.0 document for additional information.

Embodiments disclosed herein relate to various embodiments of an enhanced multi-channel DLP 110 which may be implemented on the STAs 104 and the AP 106 within the infrastructure BSS network 102. The enhanced DLP 110 may be implemented as part of the MAC sublayer. In accordance with the enhanced DLP 110, STAs 104 within the same infrastructure BSS network 102 may be configured to trigger the formation of multiple small temporary adhoc groups using different frequency channels. This may increase the throughput in many situations, as will be described in greater detail below.

Figure 2:
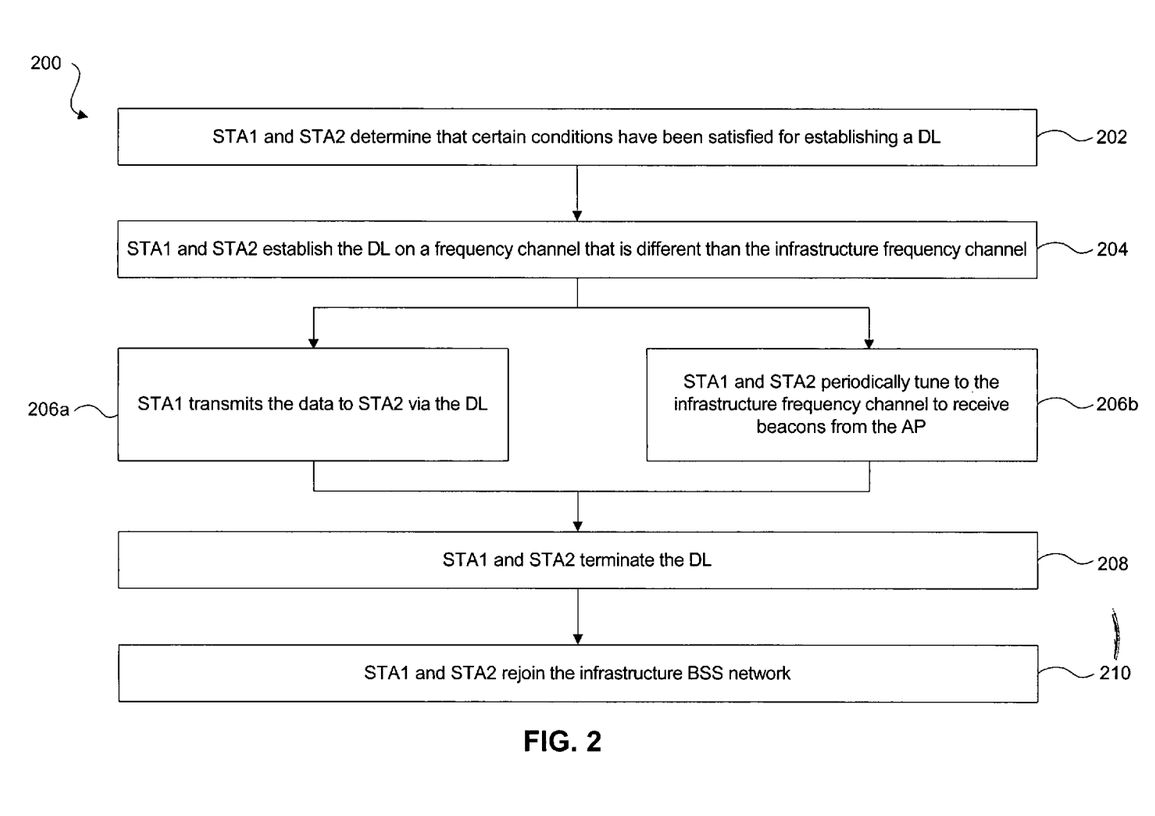
FIG. 2 is a flow diagram illustrating an embodiment of a method which may be performed by the first wireless station and the second wireless station in the infrastructure basic service set network shown in FIG. 1.

FIG. 2 is a flow diagram illustrating an embodiment of a method 200 which may be performed by the first STA 104a and the second STA 104b in the infrastructure BSS network 102 shown in FIG. 1. In typical embodiments, the method 200 is performed when the first STA 104a has a substantial amount of data 108 for transmission to the second STA 104b. For example, a digital video camera and a PC may perform the method 200 when the digital video camera has video data for streaming to the PC.

The first STA 104a and the second STA 104b determine 202 that certain conditions have been satisfied for establishing a DL. Some exemplary conditions will be described below. The DL is then established 204 on a frequency channel that is different than the infrastructure frequency channel. This frequency channel will be referred to herein as the DL frequency channel.

After the DL is formed the STAs 104 temporarily disconnect from the infrastructure BSS network 102 and start communicating on the DL frequency channel. The first STA 104a transmits 206a the data 108 to the second STA 104b via the DL. Accordingly, a type of temporary adhoc network is formed which does not interfere with the other similar DLs and the infrastructure BSS network 102 itself. Thus, the other STAs 104 in the infrastructure BSS network 102 can continue accessing the AP 106.

When the first STA 104a and the second STA 104b are involved in the DL, the AP 106 records them as being in a virtual sleep mode. If the AP 106 receives downlink data which is destined for either the first STA 104a or the second STA 104b, the AP 106 buffers the downlink data and broadcasts a notification about the buffered downlink data in the beacon. Therefore, in some embodiments, the first STA 104a and the second STA 104b periodically tune 206b to the infrastructure frequency channel to receive beacons from the AP 106.

After the first STA 104a has transmitted the data 108 to the second STA 104b, the DL is terminated 208. In some embodiments, this involves the first STA 104a and the second STA 104b exchanging standard DL teardown request and response frames (as described in the Direct Link Protocol Specification referenced above). The first STA 104a and the second STA 104b then rejoin 210 the infrastructure BSS network 102. This may involve the first and second STAs 104a, 104b tuning to the infrastructure frequency channel and informing the AP 106 about the termination of the DL. Once the first and second STAs 104a, 104b rejoin the infrastructure BSS network 102, the AP 106 treats them like any other infrastructure client and polls them when needed.

Either of the STAs 104 involved in a DL may terminate the DL before transmission of the data 108 is finished. For example, the higher layers of one (or both) of the STAs 104 in a DL may sense high frame loss or jitter. If this occurs, the DL may be terminated and the STAs may rejoin the infrastructure BSS network 102.

For clarity, a DL has been described as involving only two STAs 104. However, more than two STAs 104 may be involved in a DL. As indicated previously, the STAs 104 involved in a DL may be referred to as a temporary adhoc group. When another STA 104 wants to connect to an adhoc group, the new STA 104 can join the adhoc group by gathering information about the adhoc group from the AP 106 and by tuning into the frequency of the adhoc network (i.e., the DL frequency). The new STA 104 may follow the same DL initiation protocol as the other STAs 104 in the adhoc group. Multiple temporary adhoc groups, each on a different frequency channel can exist in the same infrastructure BSS network 102.

Once two or more STAs 104 are in a temporary adhoc network, they may generate EDCA transmission opportunities (TXOPs) to send and receive data similar to an independent basic service set (IBSS) MAC. The TXOPs are scheduled in such a way that the STAs 104 get a chance to switch to the infrastructure frequency at regular intervals of time and listen for the beacons for AP 106 timing and buffered traffic information.

In some embodiments, the step of determining 202 that certain conditions have been satisfied for establishing a DL may be performed at least partially by the service access point (SAP) of the media access control (MAC) layers of the first STA 104a and the second STA 104b. The higher layers of the first STA 104a and the second STA 104b may also assist in performing this step.

In some embodiments, the MAC SAP of the source STA 104a maintains a counter that counts the number of consecutive MAC service data units (MSDUs) generated at the STA 104 having the same destination address. If this counter exceeds a predetermined threshold value and if the destination address is in the same infrastructure BSS network 102, the MAC SAP of the STA 104 realizes a potential possibility of a DL and sends a DL request to the destination address.

The MAC SAP of the destination STA 104b also maintains a counter that counts the number of consecutive MSDUs received at the STA 104 having the same source address. When the destination STA 104b receives a DL request from the source STA 104a, the request is accepted if this counter exceeds a threshold value. However, if the destination STA 104b determines that it also has data traffic from STAs 104 other than the source STA 104a requesting for a DL connection, it typically rejects the DL connection.

In another embodiment, the STAs 104 can also exchange their respective transmit power information in the DL requests and responses. In this way, both the STAs 104 can establish a DL with the minimum amount of transmit power required to reach each other and the AP 106 during the time in which they listen for the beacons on the infrastructure frequency channel.

Under some circumstances, the higher layers within an STA 104 may initiate formation of a DL when they determine that a particular application running on the STA 104 demands a larger share of the channel than the one presently affordable by the infrastructure BSS network 102. This may be decided based on the amount of jitter and frame loss that the application is facing.

Figure 3:
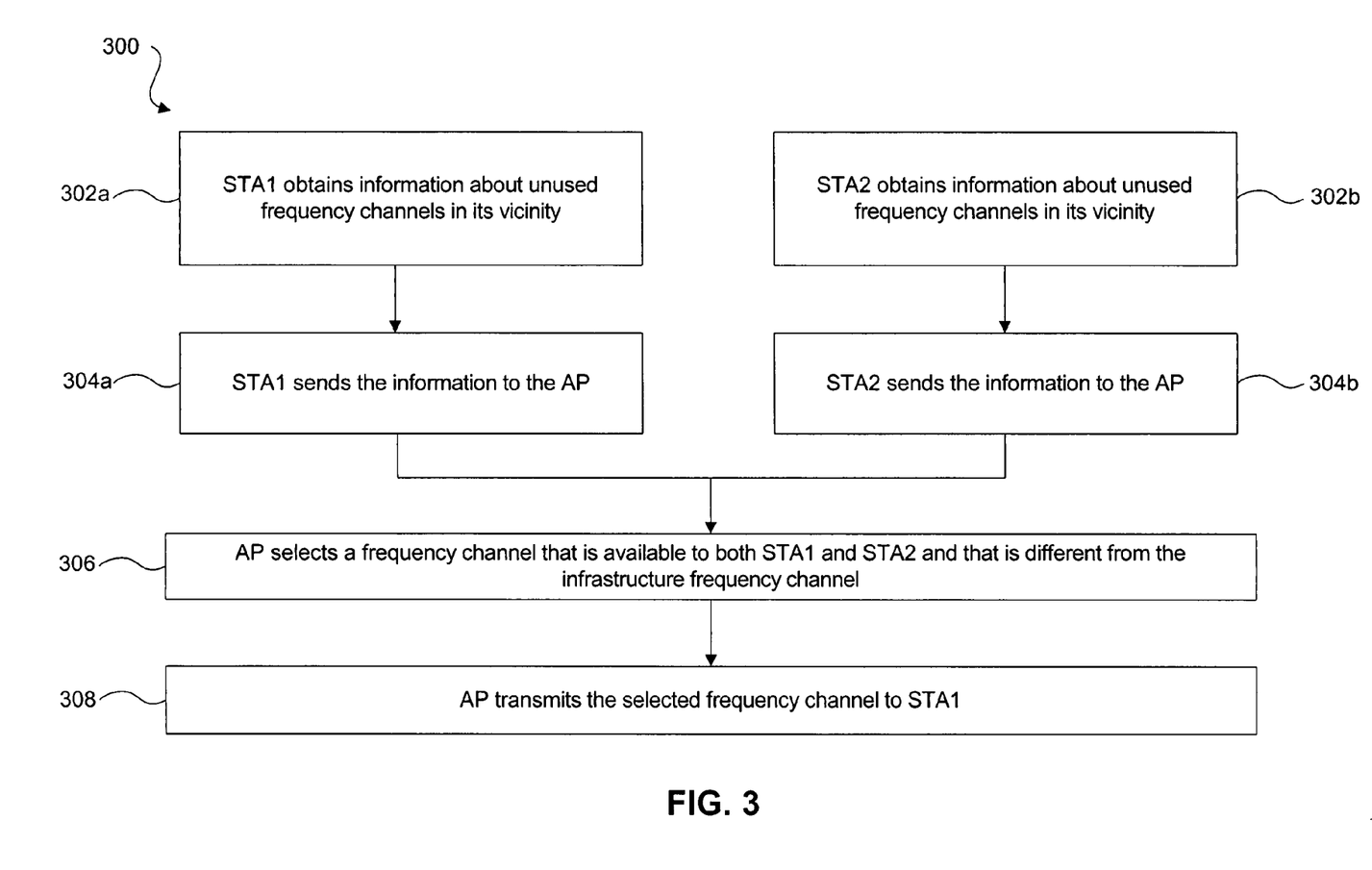
FIG. 3 is a flow diagram illustrating an exemplary method used by the AP and the wireless stations for determining the direct link frequency channel.

In some embodiments, the AP 106 may take an active role in determining the frequency channel for a DL between two (or more) STAs 104. FIG. 3 is a flow diagram illustrating an exemplary method 300 for determining the DL frequency channel.

The first STA 104a obtains 302a information about unused frequency channels in its vicinity and sends 304a that information to the AP 106. Similarly, the second STA 104b obtains 302a information about unused frequency channels in its vicinity and sends 304b that information to the AP 106.

The AP 106 uses the information that it receives from the first STA 104a and the second STA 104b to select 306 a frequency channel for the DL that is available to both the first STA 104a and the second STA 104b. The DL frequency channel is different than the infrastructure frequency channel and is also different than the frequency channels used in any other DLs in the infrastructure BSS network 102. The AP 106 then transmits 308 the selected frequency channel to the first STA 104a.

In some embodiments, the step of obtaining 302 information about unused frequency channels may be performed, at least in part, by the network interface card (NIC) of an STA 104. The NIC of an STA 104 may be configured to periodically scan certain frequency channels to determine the available frequency channels in its vicinity. For example, the NIC of an STA 104 may be configured to scan some or all of the standard channels in the unlicensed frequency bands, such as the 5 GHz and/or 2.4 GHz bands. The information about the unused frequency channels may be stored in a variety of different forms, such as a bitmap field.

Figure 4:
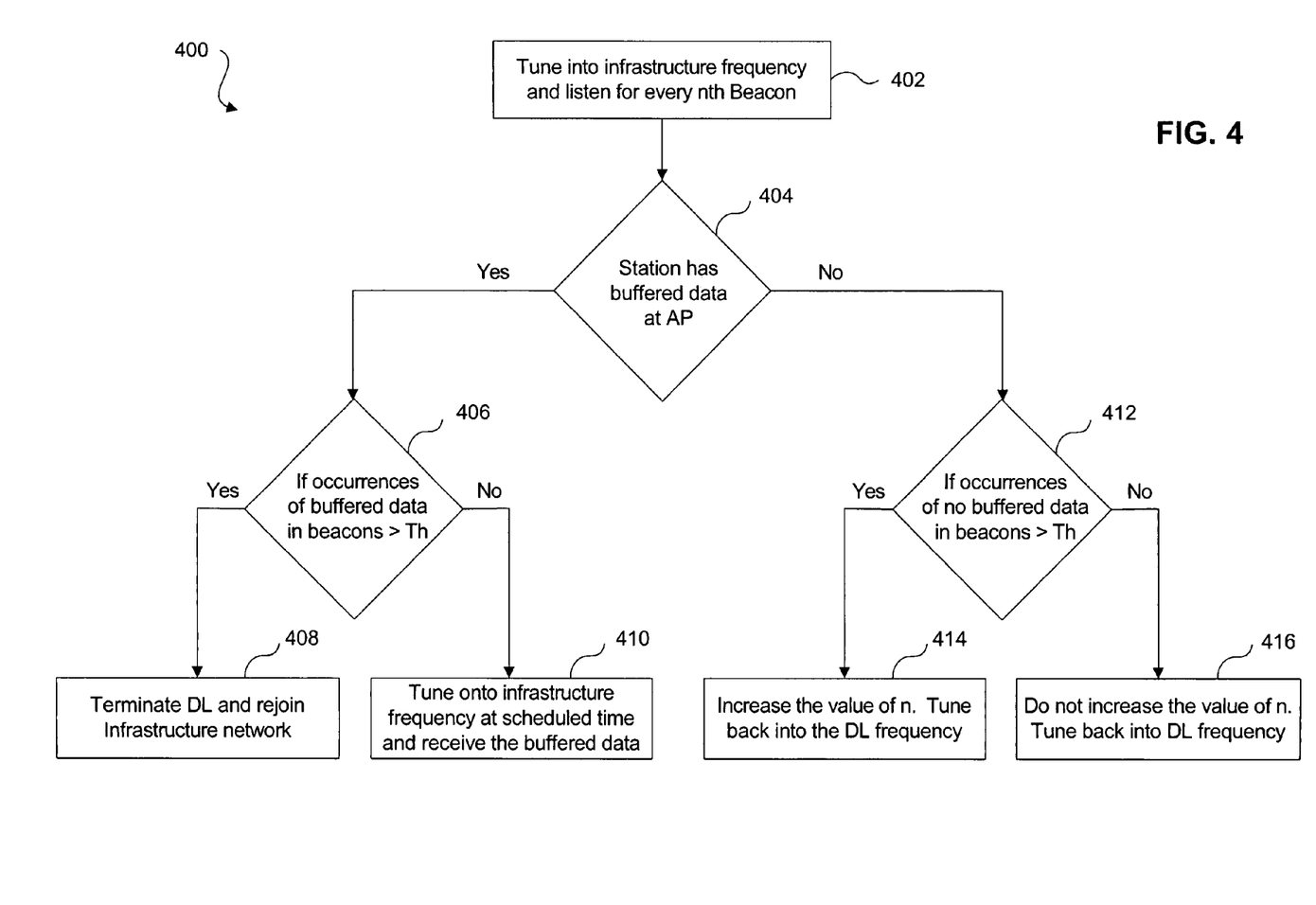
FIG. 4 is a flow diagram illustrating an embodiment of a method that may be performed by the wireless stations while they are involved in a direct link in accordance with the enhanced direct link protocol.

FIG. 4 is a flow diagram illustrating an embodiment of a method 400 that may be performed by an STA 104 while it is involved in a DL in accordance with the enhanced DLP 110.

As indicated previously, while an STA 104 is involved in a DL, it periodically tunes to the infrastructure frequency channel to receive beacons from the AP 106. In the illustrated embodiment, the STA 104 tunes 402 to the infrastructure frequency channel to receive every nth beacon.

When the STA 104 receives a beacon, the STA 104 determines 404 whether the beacon includes a notification about downlink data that is buffered at the AP 106. If there is buffered data, the STA 104 determines 406 whether a condition is satisfied for terminating the DL. In the illustrated embodiment, the STA 104 sets a counter to count the number of beacons from the AP 106 in which it finds a notification about buffered downlink data at the AP 106. If this counter crosses a threshold, the condition for terminating the DL is satisfied.

If the condition is satisfied, the DL is terminated 408 and the STA 104 rejoins the infrastructure BSS network 102. The STA 104 may then receive the downlink data via the infrastructure BSS network 102. If the condition is not satisfied, the DL is not terminated, and the STA 104 tunes 410 to the infrastructure frequency channel at scheduled time intervals to receive the buffered downlink data from the AP 106. In typical embodiments, this may involve sending a request to the AP 106 to poll it during a contention free period (CFP) in order to send the buffered downlink data.

If in step 404 it is determined that there is no buffered downlink data for the STA 104 at the AP 106, the STA 104 determines 412 whether a condition is satisfied for increasing the waiting period, i.e., the period of time that the STA 104 waits before tuning to the infrastructure frequency channel to receive another beacon. As indicated previously, the STAs 104 need not listen to all the beacons transmitted by the AP 106 but may choose to listen to every nth beacon, the value of n being decided by the STAs 104 based on certain heuristics which can be considered a design issue. For example, if the STAs 104 do not see any buffered downlink data advertised in the beacons every time they are switching to the infrastructure channel, they increase the value of n (so that they switch to the infrastructure channel less often) and continue to do so until they come to know of any downlink data buffered at the AP 106.

In the illustrated embodiment, if the number of beacons which do not include any notification about buffered downlink data exceeds a threshold, the STA 104 increases 414 the value of n and tunes back into the DL frequency channel. Otherwise, the STA 104 does not increase 416 the value of n.

Figure 5:
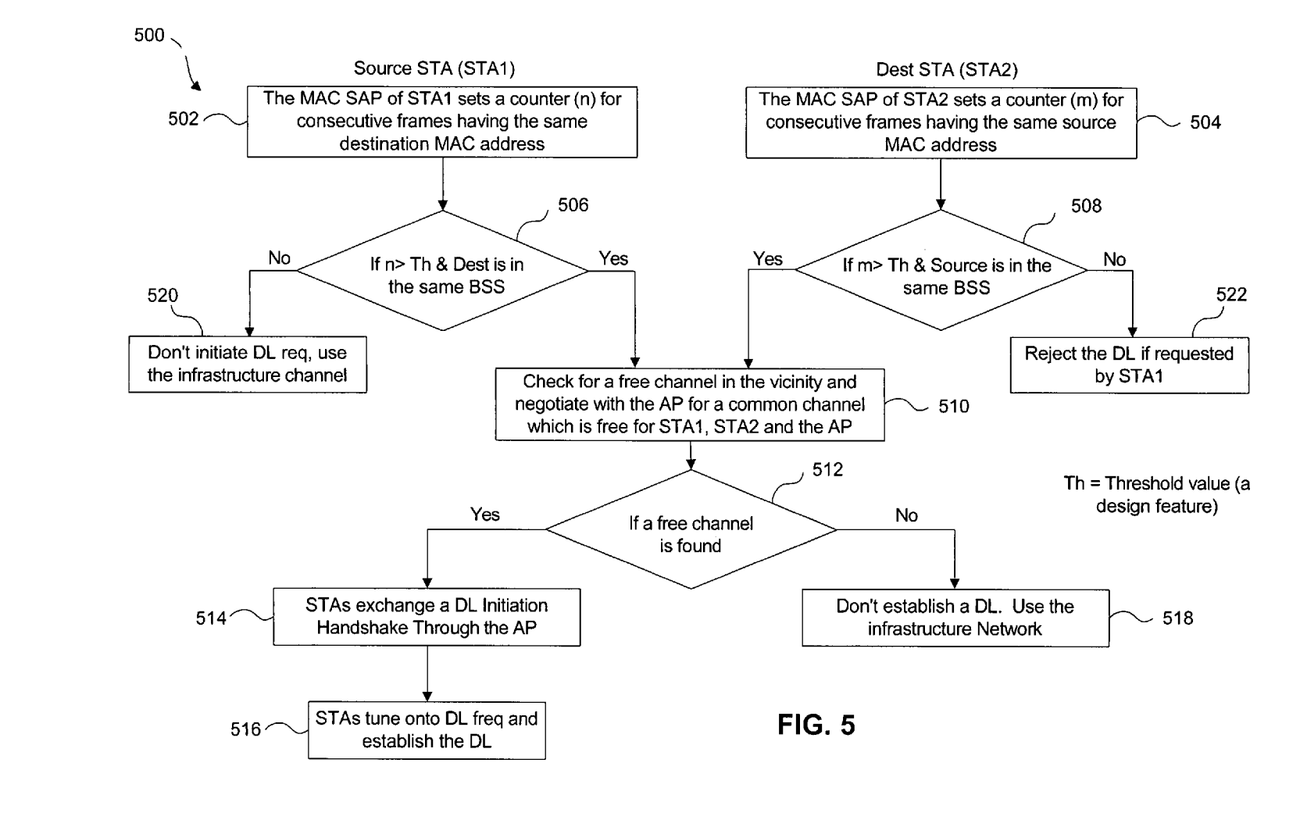
FIG. 5 is a flow diagram illustrating another embodiment of a method that may be performed by the wireless stations while initiating a direct link in accordance with the enhanced direct link protocol.

FIG. 5 is a flow diagram illustrating an embodiment of a method 500 that may be performed by a source STA 104a and a destination STA 104b in accordance with the enhanced DLP 110. The MAC SAP of the source STA 104a sets 502 a counter (n) for consecutive frames generated at the source STA 104a that have the same destination MAC address. The MAC SAP of the destination STA 104b sets 504 a counter (m) for the number of consecutive frames received at the destination STA 104b that have the same source MAC address.

If the source STA 104a determines 506 that the counter (n) exceeds a threshold and that the destination address is in the same BSS network 102, and if the destination STA 104b determines 508 that the counter (m) exceeds a threshold and that the source address is in the same BSS network 102, the source STA 104a and the destination STA 104b check 510 for a free channel in the vicinity. The source STA 104a and the destination STA 104b negotiate with the AP 106 for a common channel which is free for the source STA 104a, the destination STA 104b and the AP 106.

If a free channel is found 512, the source STA 104a and the destination STA 104b exchange 514 a DL initiation handshake through the AP 106. The source STA 104a and the destination STA 104b then tune 516 onto the DL frequency channel and establish the DL. If a free channel is not found 512, the source STA 104a and the destination STA 104b do not establish 518 a DL, and the source STA 104a uses the infrastructure network to transmit the data 108 to the destination STA 104b.

If in step 506 the source STA 104a determines 506 that the counter (n) does not exceed a threshold or that the destination address is not in the same BSS network 102, then the source STA 104a does not initiate 520 a DL request with the destination STA 104b. Instead, the source STA 104a uses the infrastructure frequency channel to transmit the data 108 to the destination STA 104b. If in step 508 the destination STA 104b determines 508 that the counter (m) does not exceed a threshold or that the source address is not in the same BSS network 102, then the destination STA 104b rejects 522 the DL if requested by the source STA 104a.

Figure 6:
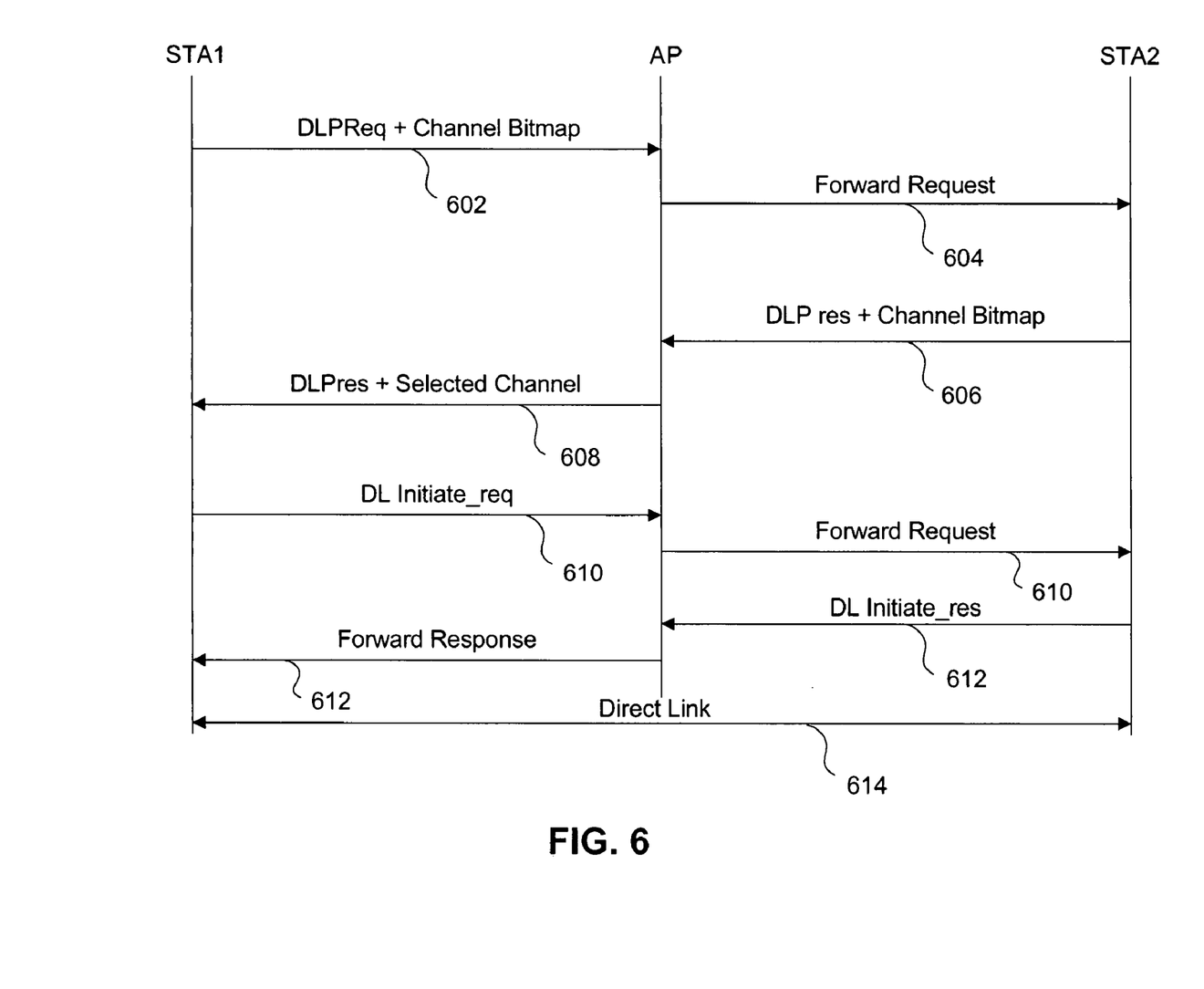
FIG. 6 is a signal flow diagram illustrating the interaction between the components in the infrastructure basic service set network in accordance with an embodiment of the enhanced direct link protocol.

FIG. 6 is a signal flow diagram illustrating the interaction between the components in the infrastructure BSS network 102 in accordance with an embodiment of the enhanced DLP 110. When the first STA 104a determines that certain conditions have been satisfied for establishing a DL with the second STA 104b, the first STA 104a sends a message 602 to the AP 106. The message 602 includes a DL request, which includes all the capability information in a standard DL request (as described in the Direct Link Protocol Specification referenced above). The message 602 also includes information about the unused frequency channels in its vicinity. This information can be conveyed in the form of a channel bitmap.

The AP 106 forwards the DL request to the second STA 104b. More specifically, the AP 106 sends a message 604 to the second STA 104b. The message 604 includes the DL request.

The second STA 104b determines whether certain conditions have been satisfied for establishing a DL with the first STA 104a. If the second STA 104b determines that the conditions for establishing a DL have been satisfied, the second STA 104b sends a message 606 to the AP 106. The message 606 includes a DL response. The DL response includes all the fields in a standard DL response (as described in the Direct Link Protocol Specification referenced above). The message 606 also includes information about the unused frequency channels in the vicinity of the second STA 104b. If the second STA 104b is not able to support the DL due to some reason, it sends a DL response with the result code set to "Refused" and the first STA 104a will try to perform its data transfer through the infrastructure BSS network 102.

Using the frequency information it has received from the first STA 104a and the second STA 104b, the AP 106 selects a frequency channel that is available to both the first STA 104a and the second STA 104b and that is different than the infrastructure frequency channel. The AP 106 also checks its database of the channels already in use and excludes the channels that are being used for the other present DL connections in the infrastructure BSS network 102. The AP 106 then sends a message 608 to the first STA 104a. The message 608 includes the DL response and the selected frequency channel. The first STA 104a then sends a DL Initiate_request frame 610 to the AP 106 on the infrastructure channel. This frame 610, along with other addressing information, contains information about the selected channel for the direct link. The AP 106 forwards this frame 610 to the second STA 104b. If the second STA 104b chooses to accept the direct link, it responds to the DL Initiate_request 610 with a DL Initiate_response frame 612 and then tunes on to the specified direct link frequency channel. The AP 106 forwards the DL Initiate_response frame 612 to the first STA 104a. If the DL initiation is a success, then the first STA 104a tunes on to the DL frequency channel and starts directly transmitting data to the second STA 104b. The second STA 104b, which is already tuned on to the mutually agreed direct link channel, will be ready to receive the data from the first STA 104a on the direct link frequency channel. From then on a DL 614 is established between the first STA 104a and the second STA 104b without interfering with the infrastructure network.

Figure 7:
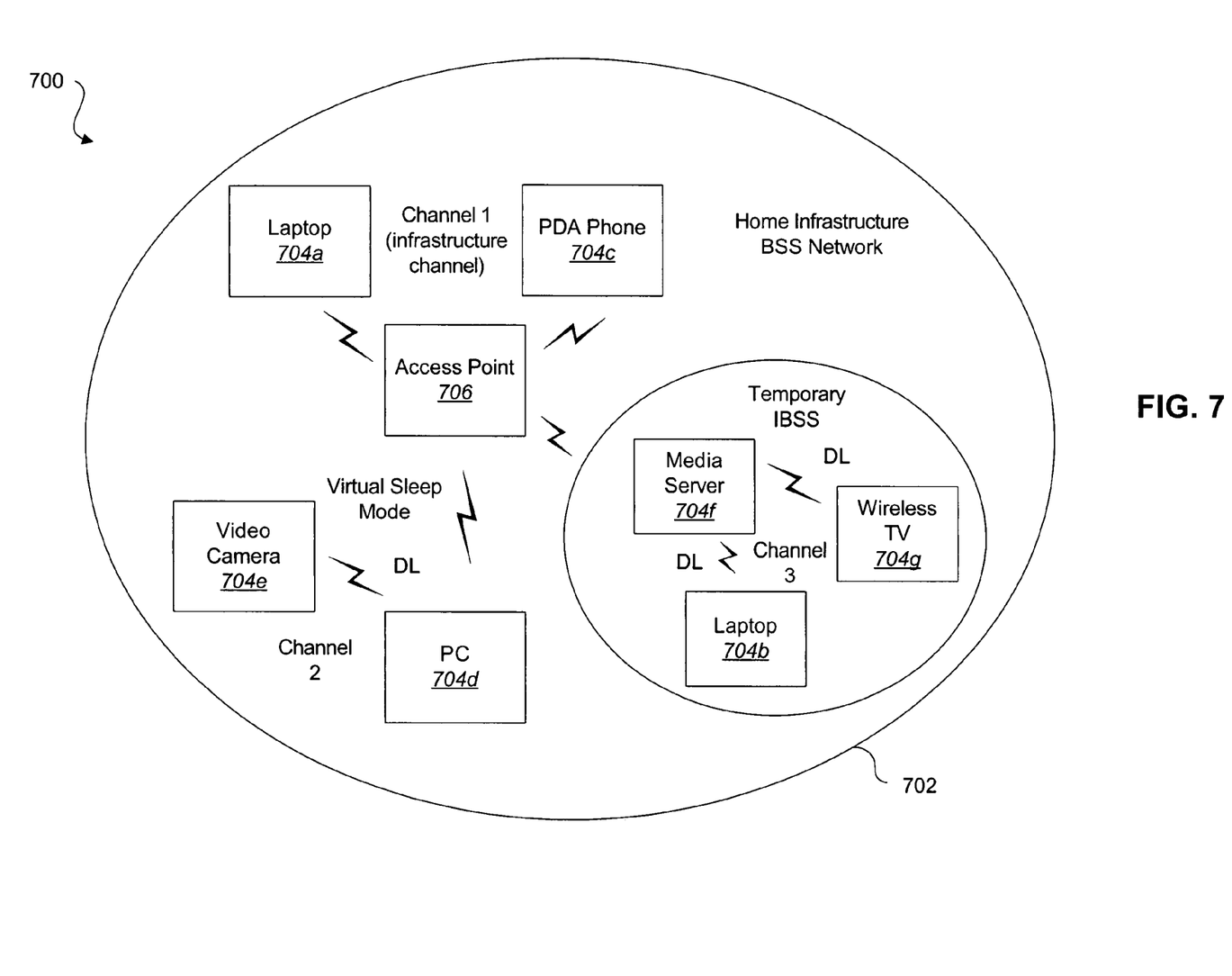
FIG. 7 is a block diagram illustrating another exemplary system in which some embodiments may be practiced.

FIG. 7 is a block diagram illustrating another exemplary system 700 in which some embodiments may be practiced. The system 700 includes an infrastructure BSS network 702 that is implemented within a person's home. The network 702 includes a variety of wireless stations 704, including first and second laptops 704a, 704b, a PDA phone 704c, a PC 704d, a digital video camera 704e, a media server 704f, and a wireless TV 704g. The infrastructure BSS network 702 also includes an AP 706.

The first laptop 704a and the PDA phone 704c are tuned to channel 1 (the infrastructure frequency channel). The PC 704d and the digital video camera 704e are involved in a DL on channel 2. The AP 706 has recorded the PC 704d and the digital video camera 704e as being in virtual sleep mode. The media server 704f, wireless TV 704g, and the second laptop 704b have formed a temporary IBSS on channel 3. The media server 704f is involved in a DL with the second laptop 704b and the wireless TV 704g.

In typical implementations, real time applications requiring minimal setup time and low bandwidth (e.g., voice) and other non-real time applications can stay connected through the infrastructure BSS network 702. High bandwidth applications like HDTV transmission which may not need the necessity to switch between the intranet and the Internet quite often (e.g., a long high definition video transfer between a TV and a PC) can form DLs and thereby achieve high throughputs.

Figure 8:
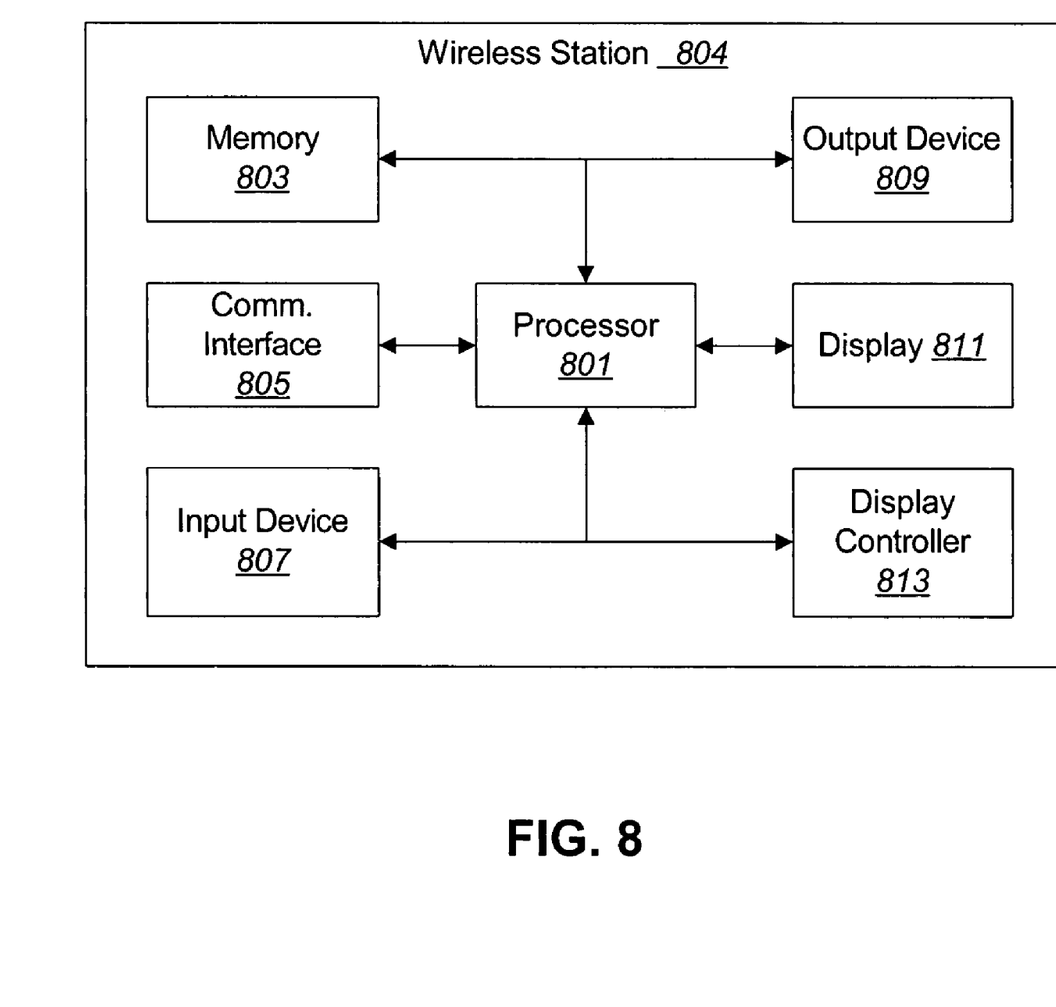
FIG. 8 is a block diagram illustrating the major hardware components typically utilized in a wireless station.

FIG. 8 is a block diagram illustrating the major hardware components typically utilized in a STA 804. The illustrated components may be located within the same physical structure or in separate housings or structures.

The STA 804 includes a processor 801 and memory 803. The processor 801 controls the operation of the STA 804 and may be embodied as a microprocessor, a microcontroller, a digital signal processor (DSP) or other device known in the art. The processor 801 typically performs logical and arithmetic operations based on program instructions stored within the memory 803.

As used herein, the term "memory" 803 is broadly defined as any electronic component capable of storing electronic information, and may be embodied as read only memory (ROM), random access memory (RAM), magnetic disk storage media, optical storage media, flash memory devices in RAM, on-board memory included with the processor 801, EPROM memory, EEPROM memory, registers, etc. The memory 803 typically stores program instructions and other types of data. The program instructions may be executed by the processor 801 to implement some or all of the methods disclosed herein.

The STA 804 typically also includes one or more communication interfaces 805 for communicating with other electronic devices. At least one communication interface 805 is based on wireless communication technology. Other communication interfaces 805 may be included which are based on wired communication technology. Examples of different types of communication interfaces 805 include a serial port, a parallel port, a Universal Serial Bus (USB), an Ethernet adapter, an IEEE 1394 bus interface, a small computer system interface (SCSI) bus interface, an infrared (IR) communication port, a Bluetooth wireless communication adapter, and so forth.

The STA 804 typically also includes one or more input devices 807 and one or more output devices 809. Examples of different kinds of input devices 807 include a keyboard, mouse, microphone, remote control device, button, joystick, trackball, touchpad, lightpen, etc. Examples of different kinds of output devices 809 include a speaker, printer, etc. One specific type of output device which is typically included in a computer system is a display device 811. Display devices 811 used with embodiments disclosed herein may utilize any suitable image projection technology, such as a cathode ray tube (CRT), liquid crystal display (LCD), light-emitting diode (LED), gas plasma, electroluminescence, or the like. A display controller 813 may also be provided, for converting data stored in the memory 803 into text, graphics, and/or moving images (as appropriate) shown on the display device 811.

Of course, FIG. 8 illustrates only one possible configuration of a STA 804. Those skilled in the art will recognize that various other architectures and components may be utilized. In addition, various standard components are not illustrated in order to avoid obscuring aspects of the invention.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array signal (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC.

The methods disclosed herein comprise one or more steps or actions for achieving the described method. The method steps and/or actions may be interchanged with one another without departing from the scope of the present invention. In other words, unless a specific order of steps or actions is required for proper operation of the embodiment, the order and/or use of specific steps and/or actions may be modified without departing from the scope of the present invention.

While specific embodiments and applications of the present invention have been illustrated and described, it is to be understood that the invention is not limited to the precise configuration and components disclosed herein. Various modifications, changes, and variations which will be apparent to those skilled in the art may be made in the arrangement, operation, and details of the methods and systems of the present invention disclosed herein without departing from the spirit and scope of the invention.

What is claimed is:

1. A computer-readable medium for storing program data, wherein the program data comprises executable instructions for implementing a method in a first wireless station that is part of an infrastructure basic service set network, the infrastructure basic service set network also comprising an access point and a second wireless station, the wireless stations of the infrastructure basic service set network communicating on an infrastructure frequency channel, the method comprising:

determining that a number of consecutive frames generated at the first wireless station have a same destination address and exceed a threshold value;

a with the second wireless station on a direct link frequency channel that is different than the infrastructure frequency channel based on the determination; and transmitting the data to the second wireless station via the direct link.

2. The computer-readable medium of claim 1, wherein after the data has been transmitted to the second wireless station the method further comprises:

terminating the direct link; and rejoining the infrastructure basic service set network.

3. The computer-readable medium of claim 1, wherein while the direct link is established between the first wireless station and the second wireless station the method further comprises periodically tuning to the infrastructure frequency channel to receive beacons from the access point.

4. The computer-readable medium of claim 3, wherein the method further comprises:

receiving a beacon that comprises a notification about downlink data for the first wireless station that is buffered at the access point;

determining whether a condition is satisfied for terminating the direct link;

if the condition is satisfied, terminating the direct link and rejoining the infrastructure basic service set network; and if the condition is not satisfied, tuning to the infrastructure frequency channel at scheduled time intervals to receive the downlink data from the access point.

5. The computer-readable medium of claim 3, wherein the method further comprises:
    periodically tuning to the infrastructure frequency channel to receive every $n$th beacon; and
    if the first wireless station does not see any buffered downlink data advertised in the beacons, increasing the value of n.

6. The computer-readable medium of claim 1, wherein the method further comprises:
    obtaining unused frequency channels information about unused frequency channels near the first wireless station;
    sending the unused frequency channels information to the access point; and
    receiving the direct link frequency channel from the access point.

7. The computer-readable medium of claim 1, wherein the method further comprises:
    determining that the destination address is in the infrastructure basic service set network.

8. A computer-readable medium for storing program data, wherein the program data comprises executable instructions for implementing a method in a second wireless station that is part of an infrastructure basic service set network, the infrastructure basic service set network also comprising a first wireless station and an access point, the wireless stations of the infrastructure basic service set network communicating on an infrastructure frequency channel, the method comprising:
    determining that a number of consecutive frames received at the second wireless station have a same source address and exceed a threshold value;
    a with the first wireless station on a direct link frequency channel that is different than the infrastructure frequency channel based on the determination; and
    receiving the data from the first wireless station via the direct link.

9. The computer-readable medium of claim 8, wherein the method further comprises:
    determining that the source address is in the infrastructure basic service set network.

10. In a first wireless station that is part of an infrastructure basic service set network, the infrastructure basic service set network also comprising an access point and a second wireless station, the wireless stations of the infrastructure basic service set network communicating on an infrastructure frequency channel, a method comprising:
    determining that a number of consecutive frames generated at the first wireless station have a same destination address and exceed a threshold value;
    a with the second wireless station on a direct link frequency channel that is different than the infrastructure frequency channel based on the determination; and
    transmitting the data to the second wireless station via the direct link.

11. The method of claim 10, wherein after the data has been transmitted to the second wireless station the method further comprises:
    terminating the direct link; and
    rejoining the infrastructure basic service set network.

12. The method of claim 10, wherein while the direct link is established between the first wireless station and the second wireless station the method further comprises periodically tuning to the infrastructure frequency channel to receive beacons from the access point.

13. The method of claim 12, further comprising:
    receiving a beacon that comprises a notification about downlink data for the first wireless station that is buffered at the access point;
    determining whether a condition is satisfied for terminating the direct link;
    if the condition is satisfied, terminating the direct link and rejoining the infrastructure basic service set network; and
    if the condition is not satisfied, tuning to the infrastructure frequency channel at scheduled time intervals to receive the downlink data from the access point.

14. The method of claim 12, further comprising:
    periodically tuning to the infrastructure frequency channel to receive every $n$th beacon; and
    if the first wireless station does not see any buffered downlink data advertised in the beacons, increasing the value of n.

15. The method of claim 10, further comprising:
    obtaining unused frequency channels information about unused frequency channels near the first wireless station;
    sending the unused frequency channels information to the access point; and
    receiving the direct link frequency channel from the access point.

16. The method of claim 10, wherein the method further comprises:
    determining that the destination address is in the infrastructure basic service set network.

17. In a second wireless station that is part of an infrastructure basic service set network, the infrastructure basic service set network also comprising a first wireless station and an access point, the wireless stations of the infrastructure basic service set network communicating on an infrastructure frequency channel, a method comprising:
    determining that a number of consecutive frames received at the second wireless station have a same source address and exceed a threshold value;
    a with the first wireless station on a direct link frequency channel that is different than the infrastructure frequency channel based on the determination; and
    receiving the data from the first wireless station via the direct link.

18. The method of claim 17, wherein the method further comprises:
    determining that the source address is in the infrastructure basic service set network.

19. A first wireless station that is configured to be part of an infrastructure basic service set network, the infrastructure basic service set network also comprising an access point and a second wireless station, the wireless stations of the infrastructure basic service set network communicating on an infrastructure frequency channel, the first wireless station comprising:
    a processor;
    memory in electronic communication with the processor;
    instructions stored in the memory, the instructions being executable to implement a method comprising:
        determining that a number of consecutive frames generated at the first wireless station have a same destination address and exceed a threshold value;
        a with the second wireless station on a direct link frequency channel that is different than the infrastructure frequency channel based on the determination; and
        transmitting the data to the second wireless station via the direct link.

20. The first wireless station of claim 19, wherein after the data has been transmitted to the second wireless station the method further comprises:
   terminating the direct link; and
   rejoining the infrastructure basic service set network.

21. The first wireless station of claim 19, wherein while the direct link is established between the first wireless station and the second wireless station the method further comprises periodically tuning to the infrastructure frequency channel to receive beacons from the access point.

22. The first wireless station of claim 21, wherein the method further comprises:
   receiving a beacon that comprises a notification about downlink data for the first wireless station that is buffered at the access point;
   determining whether a condition is satisfied for terminating the direct link;
   if the condition is satisfied, terminating the direct link and rejoining the infrastructure basic service set network; and
   if the condition is not satisfied, tuning to the infrastructure frequency channel at scheduled time intervals to receive the downlink data from the access point.

23. The first wireless station of claim 21, wherein the method further comprises:
   periodically tuning to the infrastructure frequency channel to receive every nth beacon; and
   if the first wireless station does not see any buffered downlink data advertised in the beacons, increasing the value of n.

24. The first wireless station of claim 19, wherein the method further comprises:
   obtaining unused frequency channels information about unused frequency channels near the first wireless station;
   sending the unused frequency channels information to the access point; and
   receiving the direct link frequency channel from the access point.

25. The first wireless station of claim 19, wherein the method further comprises:
   determining that the destination address is in the infrastructure basic service set network.

26. A second wireless station that is configured to be part of an infrastructure basic service set network, the infrastructure basic service set network also comprising a first wireless station and an access point, the wireless stations of the infrastructure basic service set network communicating on an infrastructure frequency channel, the second wireless station comprising:
   a processor;
   memory in electronic communication with the processor;
   instructions stored in the memory, the instructions being executable to implement a method comprising:
      determining that a number of consecutive frames received at the second wireless station have a same source address and exceed a threshold value:
      a with the first wireless station on a direct link frequency channel that is different than the infrastructure frequency channel based on the determination; and
      receiving the data from the first wireless station via the direct link.

27. The second wireless station of claim 26, wherein the method further comprises:
   determining that the source address is in the infrastructure basic service set network.

* * * * *